United States Patent [19]
Christie

[11] Patent Number: 5,868,350
[45] Date of Patent: Feb. 9, 1999

[54] TAPE TENSIONING DEVICE

[75] Inventor: Nicolai W. Christie, Oslo, Norway

[73] Assignee: Tandberg Data ASA, Oslo, Norway

[21] Appl. No.: 786,571

[22] Filed: Jan. 21, 1997

[51] Int. Cl.[6] ............................ B65H 57/28; B65H 77/00; G03B 23/02
[52] U.S. Cl. .................................... 242/615.1; 242/346.1; 242/417.3; 242/419
[58] Field of Search ................................ 242/615.1, 615, 242/417.3, 346.1; 226/196, 197, 198

[56] References Cited

U.S. PATENT DOCUMENTS

| | | |
|---|---|---|
| 1,189,611 | 7/1916 | Morse .............................. 242/417.3 X |
| 2,603,721 | 7/1952 | Camras . |
| 2,686,230 | 8/1954 | Camras . |
| 2,696,192 | 12/1954 | Birchler et al. .................. 242/417.3 X |
| 2,864,621 | 12/1958 | Stavrakis et al. . |
| 2,873,318 | 2/1959 | Moore . |
| 3,140,033 | 7/1964 | Zivny ..................................... 226/196 |
| 3,329,434 | 7/1967 | Walker . |
| 3,372,938 | 3/1968 | Hoag . |
| 3,378,266 | 4/1968 | Karecki . |
| 3,749,851 | 7/1973 | Nakamichi . |
| 3,974,952 | 8/1976 | Swanke et al. ..................... 226/196 X |
| 3,984,049 | 10/1976 | Shawen . |
| 4,307,427 | 12/1981 | Kawachi . |
| 4,320,429 | 3/1982 | Knerich et al. . |
| 4,403,720 | 9/1983 | Grant .................................. 226/196 X |
| 4,571,654 | 2/1986 | Oishi . |
| 4,638,392 | 1/1987 | Akutsu . |
| 4,663,687 | 5/1987 | Dalziel . |
| 4,739,423 | 4/1988 | Ida . |
| 4,747,007 | 5/1988 | Ikebe et al. . |
| 4,933,788 | 6/1990 | Patel et al. . |
| 5,251,844 | 10/1993 | Albrecht et al. ................. 242/615.1 X |
| 5,323,280 | 6/1994 | Rudi . |
| 5,417,413 | 5/1995 | Huffman et al. .................... 226/198 X |
| 5,430,586 | 7/1995 | Koo . |

Primary Examiner—Michael Mansen
Attorney, Agent, or Firm—Hill & Simpson

[57] ABSTRACT

A spring loaded tape transversal tension control device is provided to equalize tape tension across the transverse cross-section of a tape to provide a more stable tension throughout the tape such that a reduction in maximum tape tension can be achieved. The device includes a central spring and an outer spring for rotationally balancing tape tension by pivoting the device under spring force to press onto, or retract from portions of the tape.

15 Claims, 4 Drawing Sheets

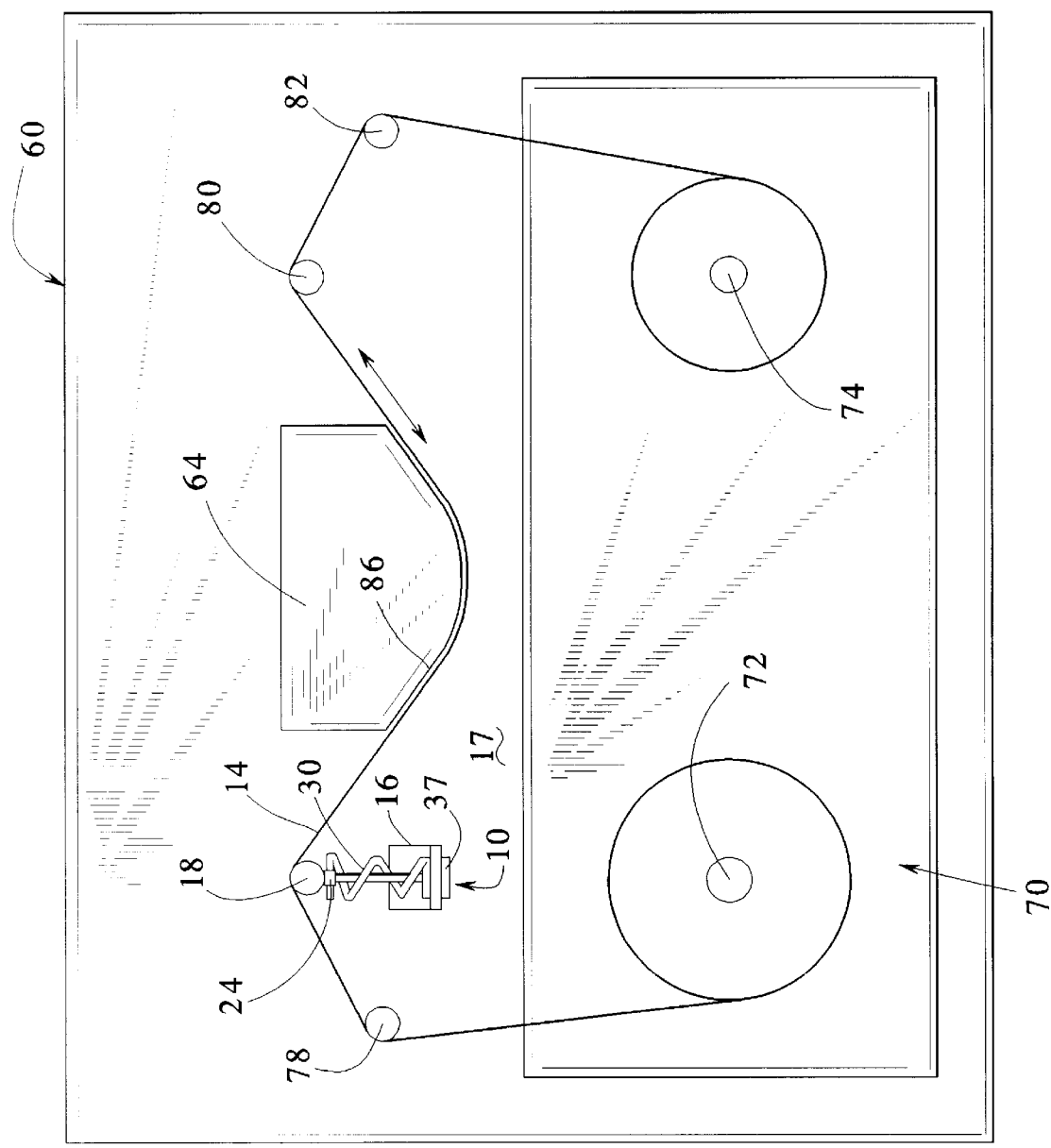

TAPE TENSIONING DEVICE

BACKGROUND OF THE INVENTION

The present invention relates to magnetic storage devices and read and write heads for tape drives, and particularly to a method and apparatus for achieving uniform head to tape contact at all tape track positions.

An important requirement in the field of recording on magnetic tape is that the tape is in physical contact with the head for reading and writing. This requirement is different for magnetic recording on a hard disc, for example, where there is a space between the recording medium and the head. In high density recording, proper head-to-tape contact is of extreme importance, since a separation between the head and the tape on the order of magnitude of only a few nanometers creates a significant loss of signal amplitude from the head, due to the so called "distance loss". In order to achieve proper contact between the magnetic head and the tape, various methods have been used.

One attempt at maintaining sufficient head-to-tape contact has been the use of a vacuum, such that a suction at each side of the write or read head keeps the tape in a very well defined and precisely controlled contact with the head. Although this method is efficient, the apparatus is too complex to accommodate easily into smaller form factors, low profile tape drives, in use today. Another method of assuring adequate tape to head contact is to use a pressure pad on a side of the tape opposite to the head and press the tape into contact with the head. The disadvantage of this method is the difficulty of obtaining a uniform contact and surface pressure between the head and the tape due to irregularities in the material of the pressure pad, or the fact that dust particles may collect on the pressure pad and produce a variation of the surface pressure over the area of the pressure pad.

A third method of achieving sufficient tape-to-head contact is to tension the tape during its circulation, while arranging the head to protrude into the tape path so that a force proportional to the tape tension retains the tape in contact with the magnetic head. This method is relatively simple to implement and has been a very efficient way to provide proper head to tape contact. The tape may be tensioned in different ways such as by mechanical friction or by electrical control of the motors that are connected to the tape hubs.

Another known method of achieving a precise control of the tape tension, such as in a magnetic recording device with the tape hubs directly driven by electric motors, such as is a professional open-real tape recorder, is to position a spring-loaded bar or pin made of a completely non-magnetic material into the tape path. If such a tension control device is designed properly, the force that the pin exerts on the tape is by and large independent of the position of the pin, and the pin is oriented such that the centered line coincides completely with a line in the plane formed of the tape surface, that is, perpendicular to the direction of movement to the magnetic tape when the tape is not in contact with the tensioning device. Thus, this tension control device will compensate random variations in the tape tension below the resonance frequency, that is determined by the moveable mass of the mechanical tensioning device and the spring constant. Such variations in the tape tension may for example be produced by random variations of the friction coefficient as the tape moves through the tape guiding mechanism.

A problem relating to the method of tensioning of tape in order to achieve proper head to tape contact, is that the tape tension is sometimes not distributed equally over the transverse cross section of the tape. This unequal distribution of tape tension is due to the fact the thickness and other properties of the tape base film vary along the tape but also because the tape is slitted with limited accuracy. Tape manufacturers continuously work to increase the quality of the base film and precision of the slitting process in the production of todays high performance computer tapes, however variations in slitting of the tape causes the center line of the tape to deviate from a straight line when it is laid down freely on a surface, and consequently a non-uniform tension along the cross section of the tape is produced when the tape is tensioned and forced into a straight guiding mechanism.

A non-uniform tape tension, or a varying "transversal tension-profile" of the tape may result in deficient head-to-tape contact with resulting loss in signal amplitude. Due to this factor, the tape tension must be increased to a level that generally is significantly higher than the level that would be required for a perfectly slitted tape with a completely uniform base film. However, increased tape tension is not desirable because of increased wear of the tape surface as well as the tape edges, increased wear of the magnetic head, higher generation of heat in the tape guiding mechanism, and increased power dissipation of the electrical motors or mechanical tape tensioning devices. The mechanical stress and wear of the tape edges is caused by the forces that act on the tape due to the mentioned imperfections of the slitting process and variations of the properties of the base film, and these forces increase with increasing tape tension. Nevertheless, the current requirement for even higher recording densities requires a precisely controlled level of tape tension along the complete cross section of the tape, while reducing mechanical wear of the magnetic head and tape is reduced to a minimum.

SUMMARY OF THE INVENTION

It is an object of the invention to provide a method and apparatus for an accurate control of the tape tension across a complete cross section of the tape in order to achieve uniform head-to-tape contact at all track positions. It is an object of the present invention to obtain optimized read and write performance at very high transition densities even at low values of the total tension of the tape, and consequently to provide low tape wear and low head wear, as well as reduced heat generation between tape and stationary parts.

The objects are achieved by a tape tensioning device, also called "transversal tape tension controller," which provides a bar that is mounted to a spring-loaded pin. The device can be positioned into the tape path in such a way that the tape forms an angle as it passes the tension controller. Due to the tape tension, the spring is compressed to a point where the spring force equals the force component of the tape tension that is directed against the tension controller. The tension controller is furthermore positioned in such a way that without any load, the central line of the bar that is in contact with the tape surface, coincides with the line in the plane formed by the tape that also is perpendicular to the direction of movement to the tape, when the tension controller is not inserted into the tape path.

The tension controller can be positioned on the front side or the back side of the magnetic surface of tape. It may also be a part of the cartridge that also contains a guiding mechanism for the tape, or it may be part of the magnetic recording device.

The transversal tension controller may be designed with separate springs for the upper and lower parts in order to obtain an asymmetric design where needed. The spring constants may be different, or the lengths of the springs (when measured without any load) may be different. A design that includes a flexible control surface may be able to compensate for second-or higher-order components of the transversal tension of the tape. Thus, the invention provides a method and apparatus for accurate control of the tape tension across the complete cross-section of the tape, in order to achieve uniform head-to-tape contact at all track positions, and to obtain optimized read and write performance at very high transition densities and even at low values of the total tension of the tape, and consequently low tape wear as well as low head wear.

BRIEF DESCRIPTION OF THE DRAWINGS

FIG. 5 is a schematic plan view of the tensioning device applied to a tape cartridge and tape drive arrangement.

DETAILED DESCRIPTION OF THE PREFERRED EMBODIMENTS

Figure 1:
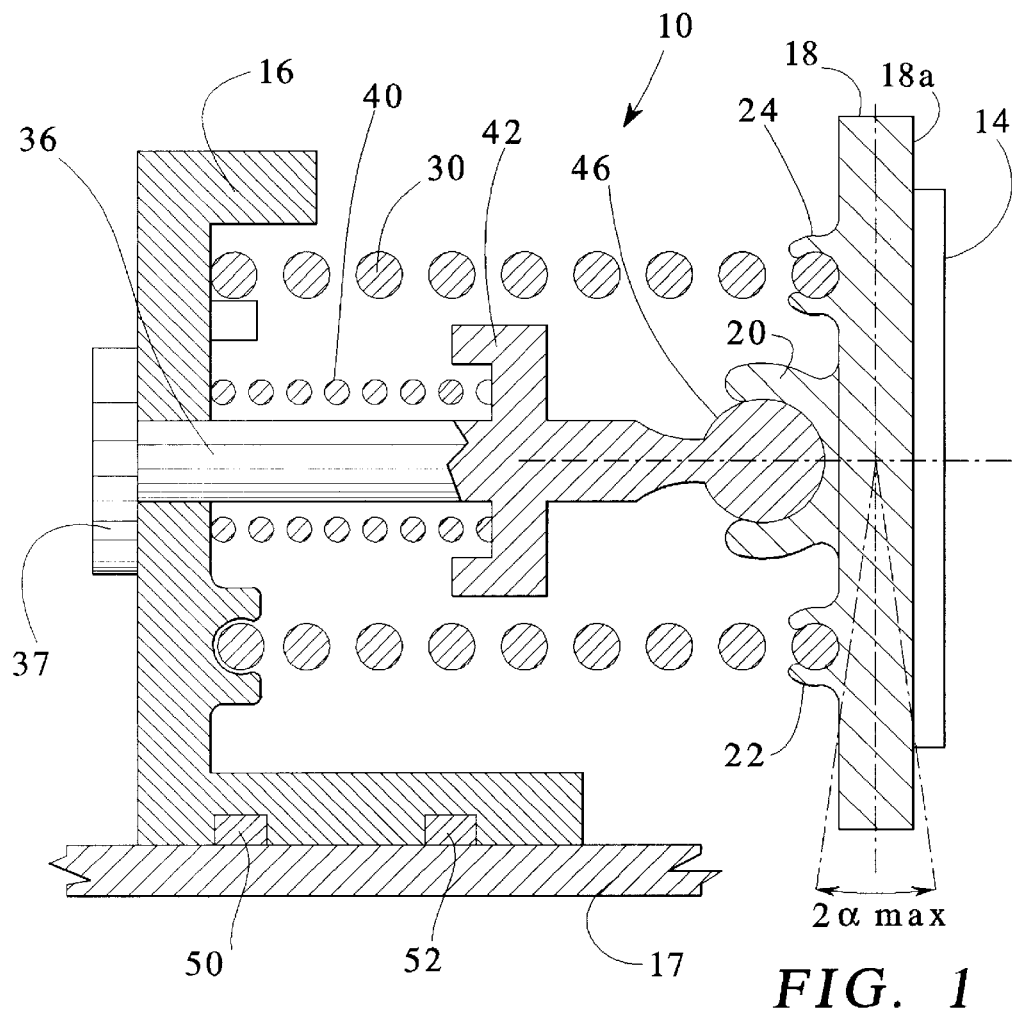
FIG. 1 is a schematic longitudinal sectional view of a transversal tape tensioning device of the present invention.

FIG. 1 illustrates an advantageous apparatus of the present invention. A tape tensioning device 10 is provided to press against a span of magnetic tape 14 to control the tape tension of the tape 14 as shown in FIG. 5. The device 10 includes a relatively stationary backstop 16 connected firmly to a floor structure 17 of the tape drive. A tension control bar 18 is provided to press against and tension the tape 14. The control bar 18 has formations on a side opposite the tape 14 including a cylindrical socket 20 and spring clips 22, 24 arranged on opposite sides, vertically, of the cylindrical socket 20.

A coil spring 30 is grasped by the spring clips 22, 24 and extends backward to the backstop 16. The spring 30 biases the control bar 18 and is sufficiently flexible to allow the control bar 18 to pivot to an angle of a in either direction. The total angular movement of the bar 18 is 2 α max. A pin 36 is spring loaded away from said backstop 16 by a second coil spring 40 arranged between the backstop 16 and an annular shoulder 42 formed on the pin 36. A head portion 37 retains the pin 36 onto the backstop 16 and limits the full extent of the pin 36 away from the backstop 16. Extending further along a length of the pin 36 from the shoulder 42, is a cylindrical joint element 46 received in the cylindrical socket 20. The spring 40 biases the shoulder 42 and thus the entire pin 36 away from the backstop 16 and thus biases the control bar 18 towards the tape 14.

Figure 1B:
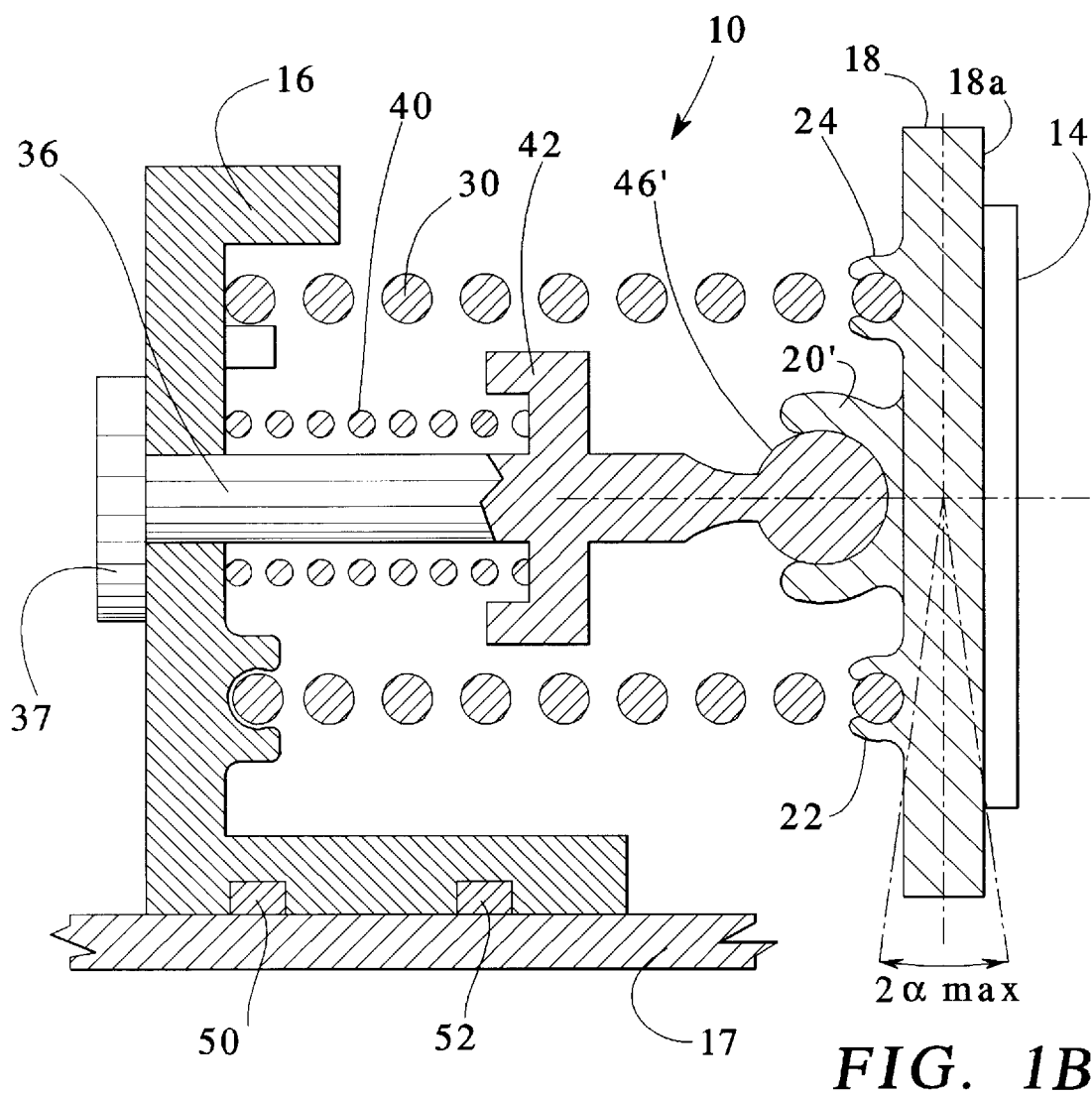
FIG. 1b is a schematic longitudinal sectional view of an alternate arrangement of the transversal tape tensioning device as shown in FIG. 1.

Alternatively to the cylindrical socket 20 and the element 46, a ball socket 20' and a ball element 46' can be used, shown in FIG. 1b.

The second spring 40 stabilizes the initial total tape tension, and the first spring 30 controls the transversal tape tension if the spring constant of the spring 40 is much higher than the spring constant of the spring 30. A surface 18a of the control bar 18, which is advantageously a cylindrical surface, moves according to the actual tape tension. The surface 18a may be made flexible, for example by a layer of flexible material applied onto the bar 18, to compensate for second or higher order components of the transversal tension of the tape. However, second order components are probably not significant due to the geometry of the problem, that is, a relatively small tape width compared to the total length of the tape path, so reduction of only first order components would in most cases be sufficient.

The high tension part of the tape actively increases the tension of the other regions of the tape, transversely, as the tension control bar pivots at the ball and socket 46/20 in one or the other rotary directions towards + or −α max. The backstop 16 is connected at fastener locations 50, 52 to the base plate 17 of the tape drive. The fastener locations may be bars which lock the backstop 16 to the floor 17 by adhesive.

For a case where the tape moves horizontally and the tape path is formed by hypothetical perfectly aligned vertical guides and pins, from an equilibrium consideration, the control surface of the tension control bar 18a, that is in contact with the tape 14, will also be vertically arranged, given that the tension control bar is symmetrical above the center line of the tape and that the tape tension is uniformly a cross-section of the tape. The described equilibrium state is characterized by the angle α of the control bar equal to zero. However, if the tape tension is higher at an upper part of the tape, the control surface 18a of the transversal tension controller 18 would be pressed inwardly relative to the lower part of the control surface, leading to a nonzero angle α. The lower part of the control surface is thus pressed outwardly, and the effect of this is that the tape tension of this part of the tape is increased, since the distance this part of the tape has to travel becomes longer (as seen in FIG. 5). The tape tension of the upper part of the tape is on the contrary reduced, since this part of the tape will have a shorter travel. As a consequence, the difference between the tape tension and the upper and lower part of the tape is reduced. As a secondary effect of this, the force that presses the tape against the guide flange in a vertical direction is reduced, and thus also reduced is the mechanical load on the tape edge.

Figure 3:
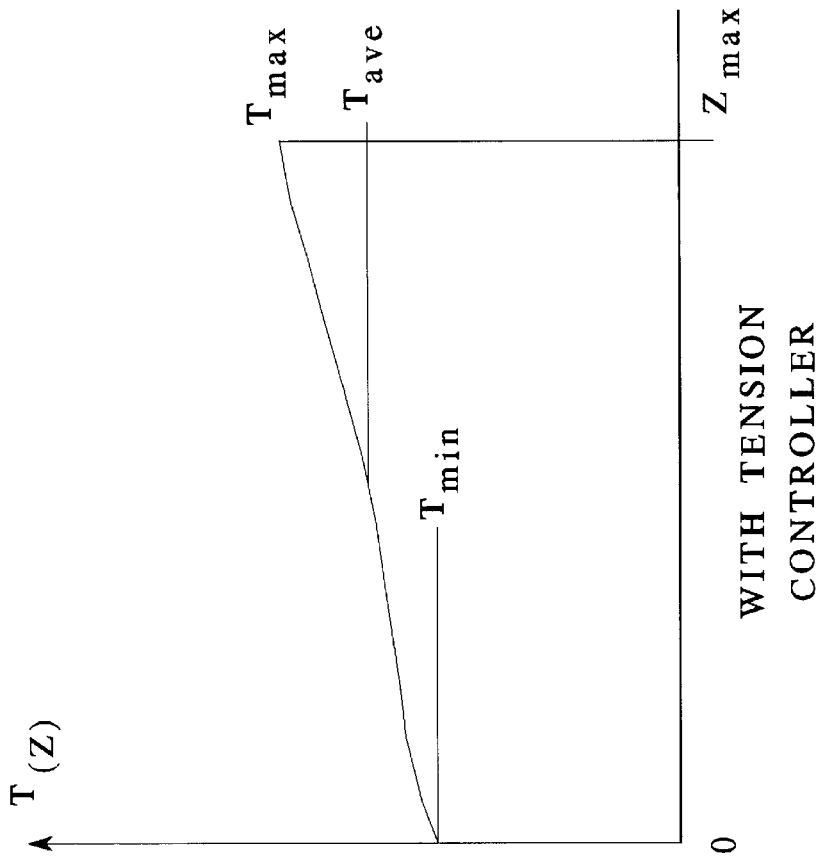
FIG. 3 is a graphical representation of a tape transversal tension profile of the present invention including tension controller.
Figure 2:
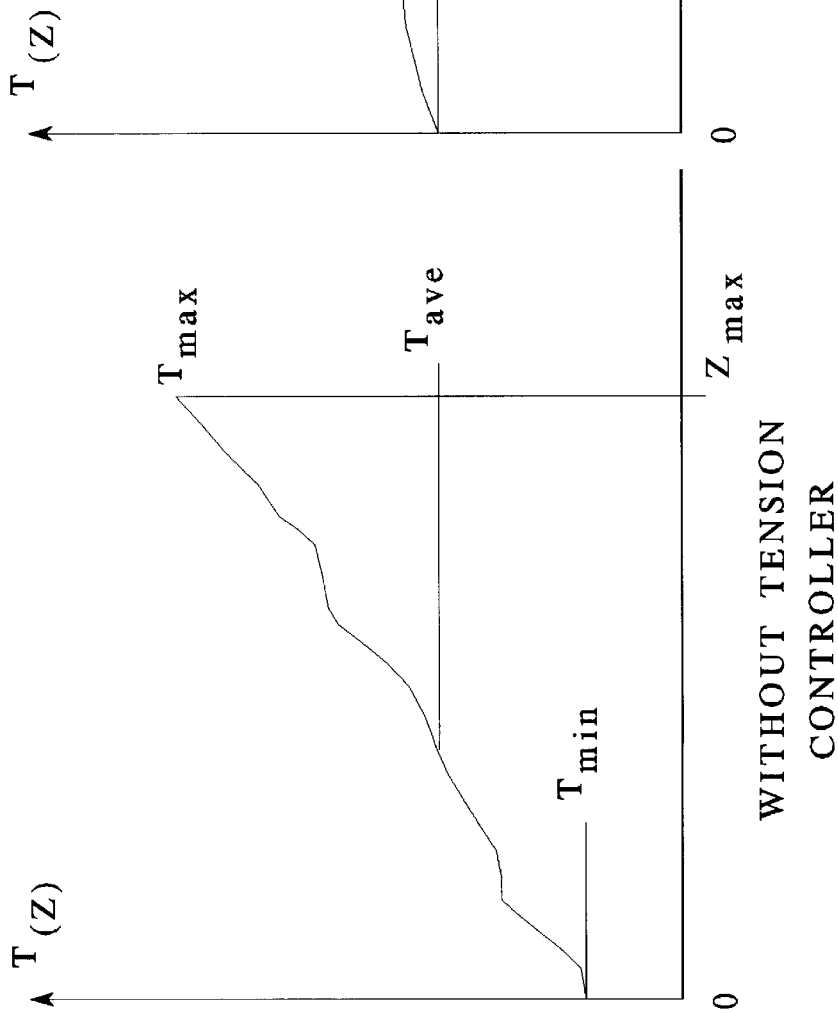
FIG. 2 is a graphical representation of a tape transversal tension profile of a prior known tape device.

FIG. 2 illustrates a condition experienced in the known tape tensioning devices wherein it is shown that the local tension T(z) along the tape varies from $T_{min}$ at the lower tape edge to $T_{max}$ at the upper tape edge although these relationships can be reversed depending on the particular tape and the tape slitting. In this case shown in FIG. 2, the local tape tension T(z) is very critical for reading and writing performance. Thus, a higher average tension $T_{ave}$ must be guaranteed in order to realize a sufficient $T_{min}$. In contrast, as shown in FIG. 3 according to the present invention, the minimum tension $T_{min}$ effectively increases for an equivalent average tension $T_{ave}$ for improved read/write operation, and the maximum tension $T_{max}$ is reduced for reduced tape and head wear, and inefficient operation can be prevented.

Figure 4:
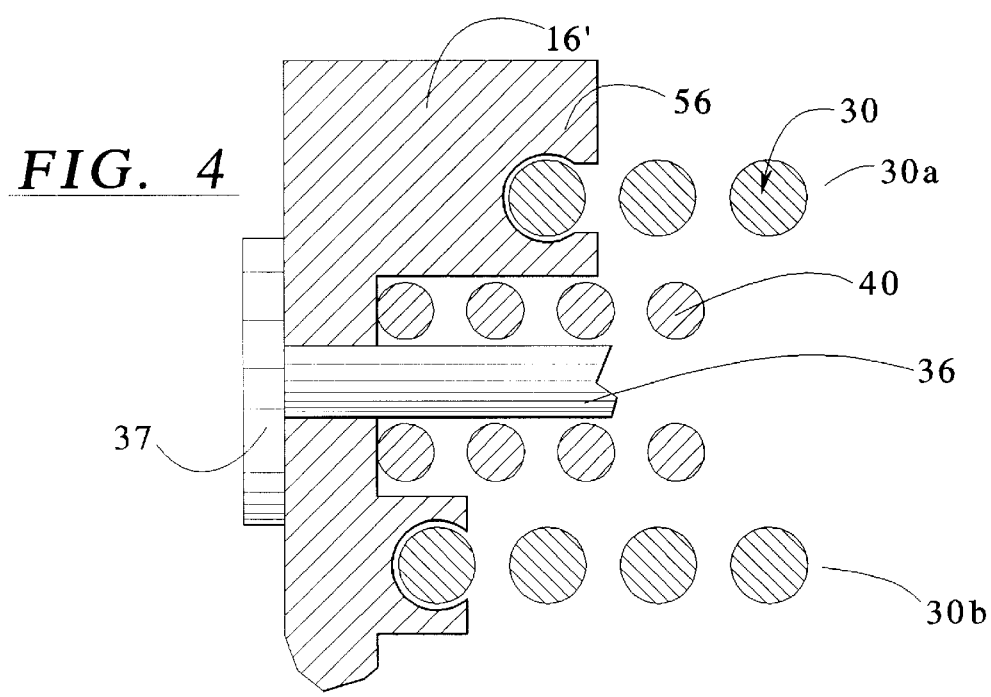
FIG. 4 is a schematic partial enlarged sectional view of an alternate arrangement of the transversal tape tensioning device as shown in FIG. 1.

FIG. 4 illustrates a variation of the structure of a backstop 16' wherein an extending spring clip portion 56 can be fashioned into the backstop 16' to define an asymmetrical reference position for an asymmetrical spring force of the spring 30 on the upper side as opposed to the lower side. That is, the spring 30 is more compressed on a top side 30a thereof toward a vertical bar 18, than at the bottom side 30b thereof. This asymmetry can be used to produce an asymmetrically tensioned tape path, i.e., a tape path with an asymmetrical transverse tape tension. FIG. 4 is shown somewhat exaggerated for demonstrative purposes. Alternatively, a separate top spring can be provided which is different from a separate bottom spring in spring constant.

FIG. 5 schematically illustrates the tensioning device 10 located in a tape drive 60 having a magnetic head 64 for read/write operation on the tape 14. A cartridge 70, having reels 72, 74 is loaded in the tape drive 60 and the tape extracted. Suitable pins, guides or rollers 78, 80, 82 are arranged to guide the tape between reels 72, 74 and across a front 86 of the head 64.

The tensioning device 10 exerts a force through the bar 18 to adjust transverse tension in the tape 14 as described above. Although the device 10 is illustrated in a tape extract type tape drive, the device can be incorporated into a non extract tape drive also. The device 10 can also be incorporated into the cartridge rather than into the tape drive.

The tension control bar 18 can be positioned in many possible ways, either on the front side or the back side of the magnetic surface of the tape.

Although the present invention has been described with reference to a specific embodiment, those of skill in the art will recognize that changes may be made thereto without departing from the scope and spirit of the invention as set forth in the appended claims.

I claim as my invention:

1. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;
   a first spring positioned between said backstop and said bar to bias said bar against said magnetic tape, said bar mounted for pivoting movement about an axis parallel to said sliding movement of said tape across said magnetic head; and
   a second spring within said first spring arranged between said backstop and said bar to bias said bar toward said tape, said first spring biasing said bar to pivot about said axis in response to unequal tape tension along a transverse cross-section of the tape.

2. The device according to claim 1 wherein said surface of said control bar is constructed from a flexible material.

3. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;
   a first spring positioned between said backstop and said bar to bias said bar against said magnetic tape, said bar mounted for pivoting movement about an axis parallel to said sliding movement of said tape across said magnetic head; and
   a pin having a shoulder wherein said control bar is pivotally connected to said pin at a first end of said pin and said pin is slidably connected to said backstop, said spring positioned between said backstop and said shoulder.

4. The device according to claim 3 wherein said surface of said control bar is constructed from a flexible material.

5. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;
   a first spring positioned between said backstop and said bar to bias said bar against said magnetic tape, said bar mounted for pivoting movement about an axis parallel to said sliding movement of said tape across said magnetic head;
   a socket on a side facing said backstop; and
   a pin extending perpendicularly from said backstop and having at one end thereof a ball joint element, said ball joint element engaged into said socket of said control bar to allow pivoting of said control bar on said ball joint element about said axis.

6. The device according to claim 5 wherein said surface of said control bar is constructed from a flexible material.

7. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;
   a first spring positioned between said backstop and said bar to bias said bar against said magnetic tape, said bar mounted for pivoting movement about an axis parallel to said sliding movement of said tape across said magnetic head;
   a socket on a side facing said backstop; and
   a pin extending perpendicularly from said backstop and having at one end thereof a cylindrical joint element, said cylindrical joint element engaged into said socket of said control bar to allow pivoting of said control bar on said cylindrical joint element about said axis.

8. The device according to claim 7 wherein said surface of said control bar is constructed from a flexible material.

9. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;
   a first spring positioned between said backstop and said bar to bias said bar against said magnetic tape, said bar mounted for pivoting movement about an axis parallel to said sliding movement of said tape across said magnetic head wherein said surface of said control bar is constructed from a flexible material.

10. The device according to claim 9 wherein said surface of said control bar is constructed from a flexible material.

11. A device for compensating tape tension variations across a transverse cross-section of a tape, the tape under tension sliding across a magnetic head for reading and writing operation, said device comprising:
   a control bar having a surface pressing against a span of said magnetic tape;
   a backstop positioned relatively stationary with respect to said magnetic tape;

a first spring positioned between said backstop and said bar to bias said bar against said magnetic tape, said bar mounted for pivoting movement about an axis parallel to said sliding movement of said tape across said magnetic head; and a coil spring wherein said coil spring and said backstop provides clip means for retaining said coil spring against said backstop.

12. The device according to claim 11 further comprising:

said clip means having a first C-shaped clip and a second C-shaped clip diametrically arranged across a diameter of said coil spring wherein said first C-shaped clip extends to a first position closer to said bar than said second C-shaped clip is to said bar to provide an asymmetrical transverse resilient force to said bar.

13. The device according to claim 11 further comprising:

clips on a side of said control bar facing said backstop to retain said first spring against said bar.

14. The device according to claim 13 further comprising:

a pin having a shoulder and arranged between said backstop and said bar; and a second spring arranged around said pin between said backstop and said shoulder, said pin rotatably connected to said bar.

15. The device according to claim 11 wherein said surface of said control bar is constructed from a flexible material.

* * * * *